United States Patent
Salem

(10) Patent No.: US 9,123,196 B1
(45) Date of Patent: Sep. 1, 2015

(54) ROTATING SANDWICH DISPENSER ASSEMBLY

(76) Inventor: Haytham Salem, Huntington Beach, CA (US)

( * ) Notice: Subject to any disclaimer, the term of this patent is extended or adjusted under 35 U.S.C. 154(b) by 388 days.

(21) Appl. No.: 13/608,513

(22) Filed: Sep. 10, 2012

(51) Int. Cl.
| | | |
|---|---|---|
| *A23P 1/00* | (2006.01) | |
| *A21B 1/48* | (2006.01) | |
| *A47J 37/08* | (2006.01) | |
| *G07F 11/00* | (2006.01) | |
| *B65H 5/00* | (2006.01) | |
| *G07F 11/26* | (2006.01) | |
| *G07F 11/54* | (2006.01) | |
| *G07F 11/70* | (2006.01) | |

(52) U.S. Cl.
CPC ............... *G07F 11/26* (2013.01); *G07F 11/54* (2013.01); *G07F 11/70* (2013.01)

(58) Field of Classification Search
CPC .......... G07F 11/26; G07F 11/54; G07F 11/70
USPC ............... 221/13, 79, 76, 80, 81, 85, 92, 113, 221/224, 150 HC, 150 R, 279; 99/443 R, 99/334, 357, 450.4, 484; 312/97.1; 414/267, 268, 271, 272, 276, 278, 285, 414/281; 198/779, 782, 346.1, 347.2, 408, 198/867.13, 952
See application file for complete search history.

(56) References Cited

U.S. PATENT DOCUMENTS

| | | | | |
|---|---|---|---|---|
| 2,626,575 A | * | 1/1953 | Whitsel | 99/450.4 |
| 2,746,830 A | * | 5/1956 | Fonda et al. | 312/270.1 |
| 3,698,601 A | * | 10/1972 | Sierk et al. | 221/105 |
| 3,859,904 A | * | 1/1975 | Carriazo | 99/450.4 |
| 4,136,764 A | * | 1/1979 | Johnson | 194/261 |
| 4,202,260 A | * | 5/1980 | Weger | 99/450.4 |
| 4,341,136 A | * | 7/1982 | Parson | 83/158 |
| 4,685,387 A | | 8/1987 | Hanson et al. | |
| 4,687,119 A | * | 8/1987 | Juillet | 221/101 |
| 4,815,190 A | * | 3/1989 | Haba et al. | 29/430 |
| 5,147,176 A | * | 9/1992 | Stolzer et al. | 414/807 |
| 5,546,848 A | * | 8/1996 | Naramura | 99/326 |
| 5,555,793 A | | 9/1996 | Tocchet et al. | |
| 6,286,715 B1 | * | 9/2001 | Ziesel et al. | 221/171 |
| 7,281,468 B2 | * | 10/2007 | Frem | 99/334 |
| D597,605 S | | 8/2009 | Davis | |
| 8,052,011 B2 | * | 11/2011 | Tam et al. | 221/256 |
| 2001/0000610 A1 | * | 5/2001 | Johnson | 221/13 |
| 2001/0010281 A1 | * | 8/2001 | Lachmann et al. | 198/346.1 |
| 2002/0195002 A1 | | 12/2002 | Dominguez et al. | |
| 2003/0056663 A1 | * | 3/2003 | Ciprietti et al. | 99/537 |
| 2004/0238555 A1 | | 12/2004 | Parks | |

(Continued)

*Primary Examiner* — Sang Y Paik
*Assistant Examiner* — Gyounghyun Bae

(57) ABSTRACT

A rotating sandwich dispenser assembly includes a housing that is positionable on a support surface. A processor is coupled to the housing. A bread dispenser is coupled to the housing. The bread dispenser is operationally coupled to the processor so the bread dispenser may dispense bread. An ingredient dispenser is rotatably coupled to the housing. The ingredient dispenser is operationally coupled to the processor so the ingredient dispenser may selectively dispense sandwich ingredients onto the loaf of bread. A conveyor belt is movably coupled to the housing. The conveyor belt is operationally coupled to the processor so the conveyor belt receives the loaf of bread from the bread dispenser. The conveyor belt may transport the loaf of bread to the ingredient dispenser. A control panel is coupled to the housing. The control panel is operationally coupled to the processor so the control panel may selectively actuate the processor.

16 Claims, 9 Drawing Sheets

(56) References Cited

U.S. PATENT DOCUMENTS

| | | | |
|---|---|---|---|
| 2008/0190953 A1* | 8/2008 | Mallett et al. | 221/13 |
| 2009/0255474 A1* | 10/2009 | Gleesing | 119/51.04 |
| 2009/0259336 A1* | 10/2009 | Ratnakar | 700/236 |
| 2010/0268792 A1 | 10/2010 | Butler et al. | |
| 2012/0183377 A1* | 7/2012 | Toguri | 414/281 |
| 2012/0185086 A1* | 7/2012 | Khatchadourian et al. | 700/233 |

* cited by examiner

ROTATING SANDWICH DISPENSER ASSEMBLY

BACKGROUND OF THE DISCLOSURE

Field of the Disclosure

The disclosure relates to rotating sandwich dispenser devices and more particularly pertains to a new rotating sandwich dispenser device for dispensing freshly made sandwiches.

SUMMARY OF THE DISCLOSURE

An embodiment of the disclosure meets the needs presented above by generally comprising a housing that may be positioned on a support surface. A processor is coupled to the housing. A bread dispenser is coupled to the housing. The bread dispenser is operationally coupled to the processor so the bread dispenser may dispense a loaf of bread. An ingredient dispenser is rotatably coupled to the housing. The ingredient dispenser is operationally coupled to the processor so the ingredient dispenser may selectively dispense sandwich ingredients onto the loaf of bread. A conveyor belt is movably coupled to the housing. The conveyor belt is operationally coupled to the processor so the conveyor belt receives the loaf of bread from the bread dispenser. The conveyor belt may transport the loaf of bread to the ingredient dispenser. A control panel is coupled to the housing. The control panel is operationally coupled to the processor so the control panel may selectively actuate the processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
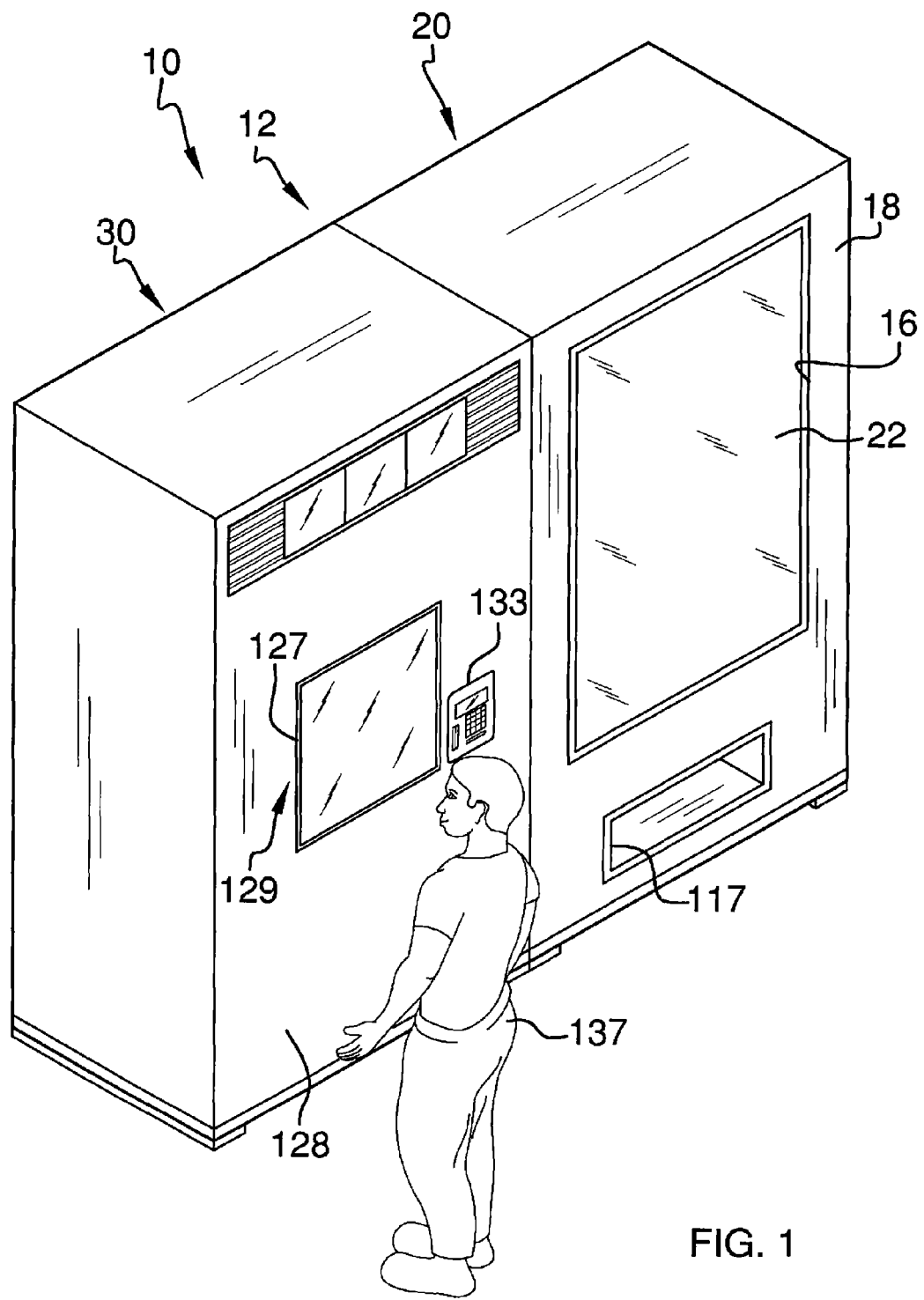
FIG. 1 is a perspective view of a rotating sandwich dispenser assembly according to an embodiment of the disclosure.
Figure 2:
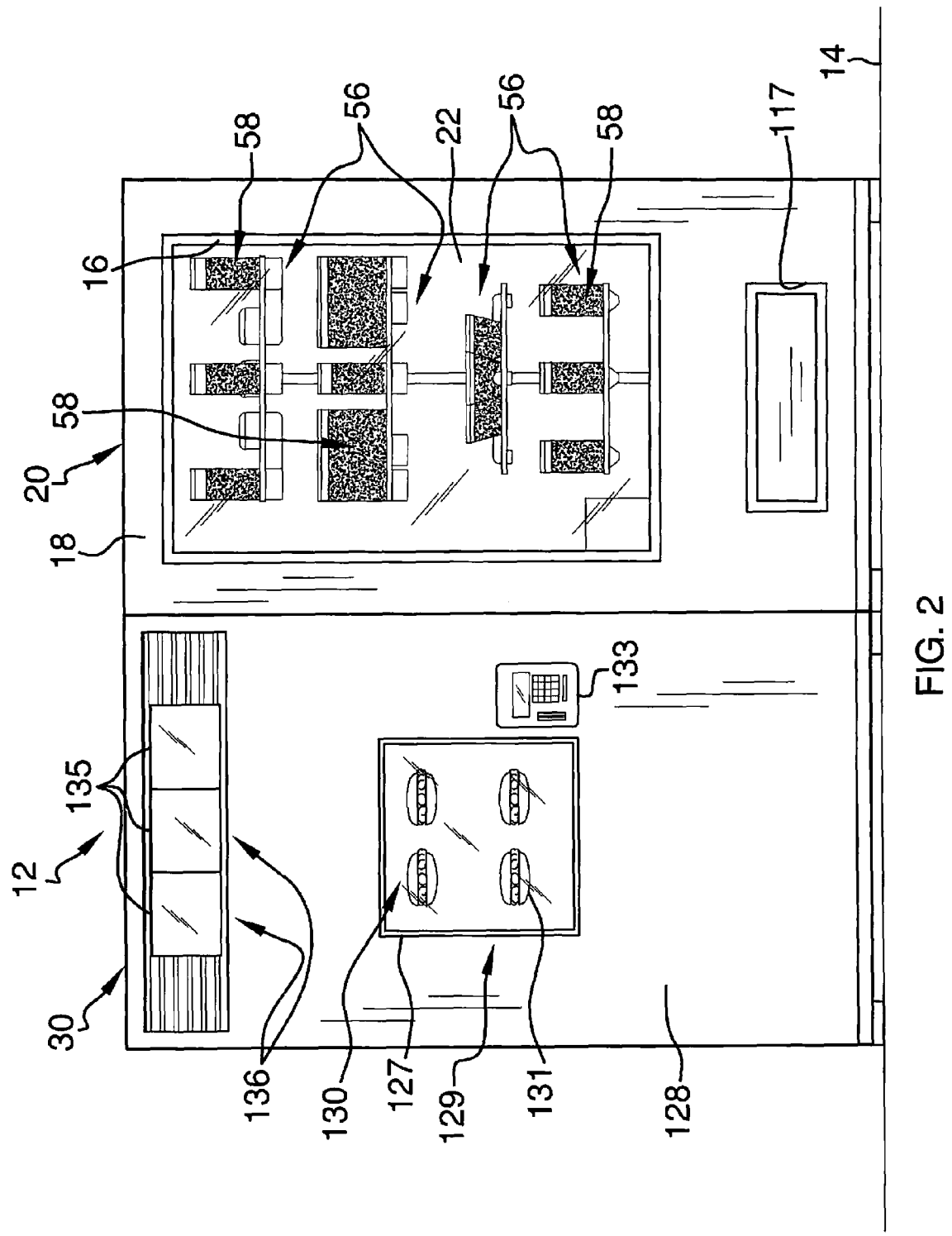
FIG. 2 is a front view of an embodiment of the disclosure.
Figure 3:
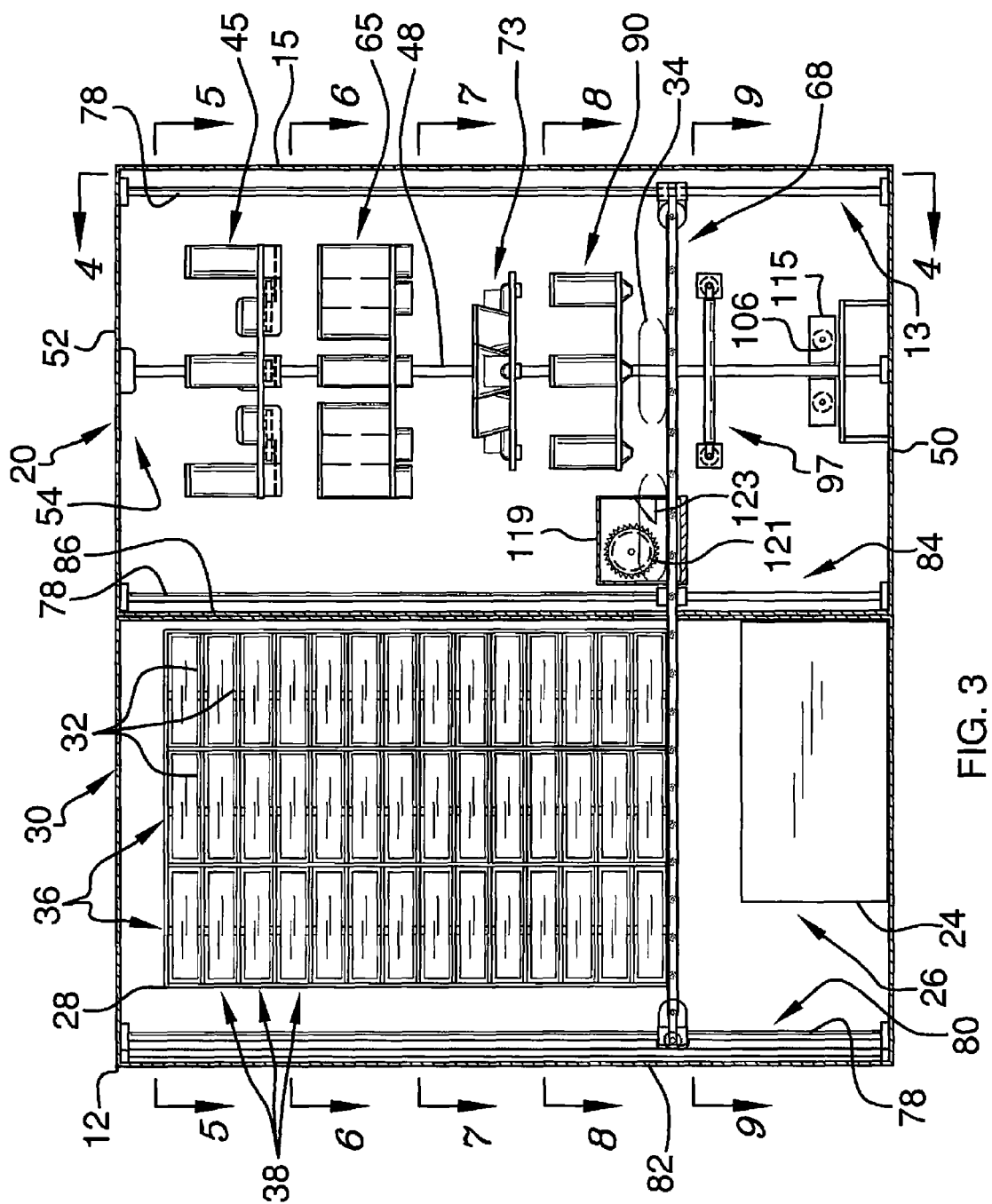
FIG. 3 is a front cut-away view of an embodiment of the disclosure.
Figure 4:
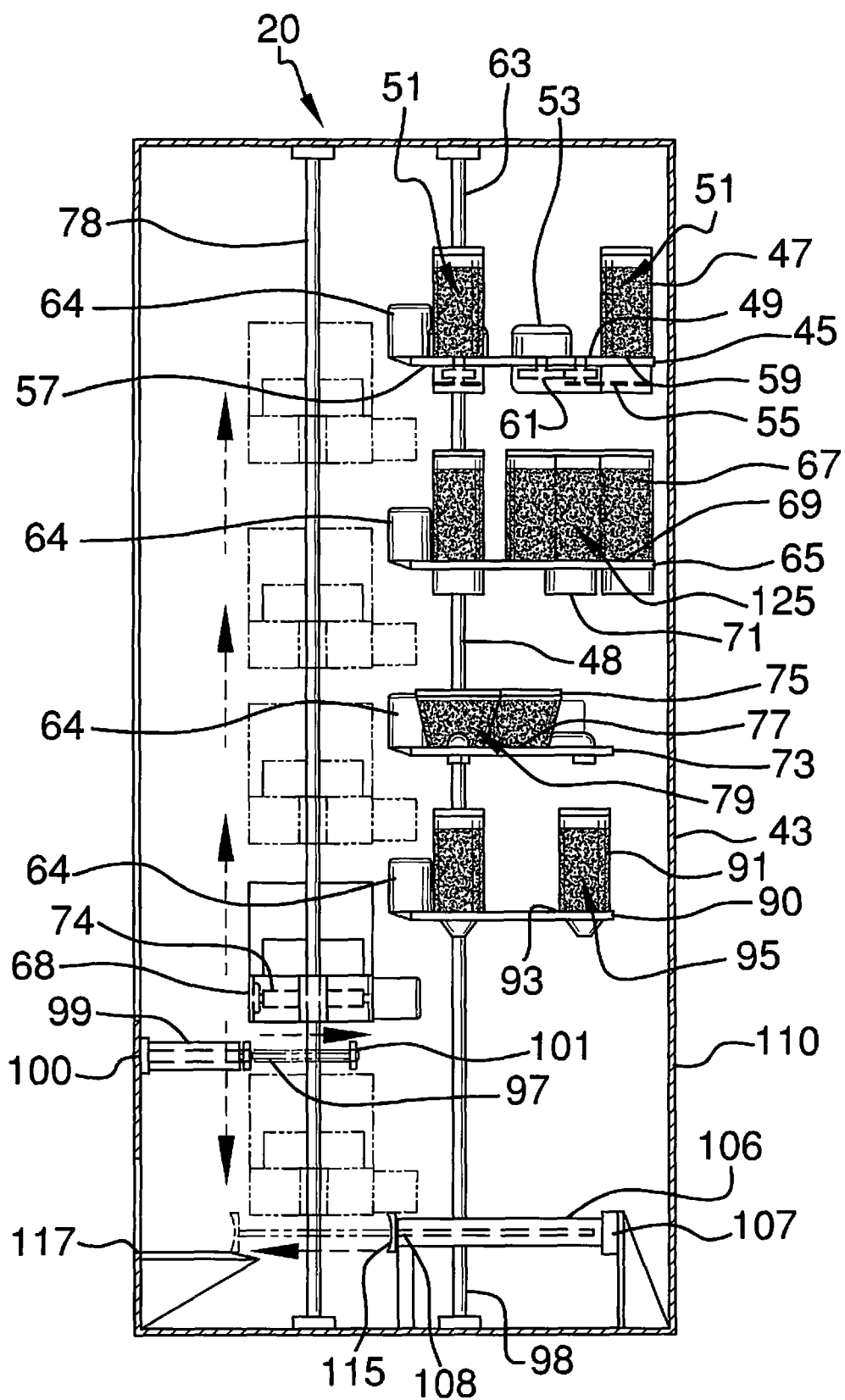
FIG. 4 is a right side cut-away view of an embodiment of the disclosure.
Figure 5:
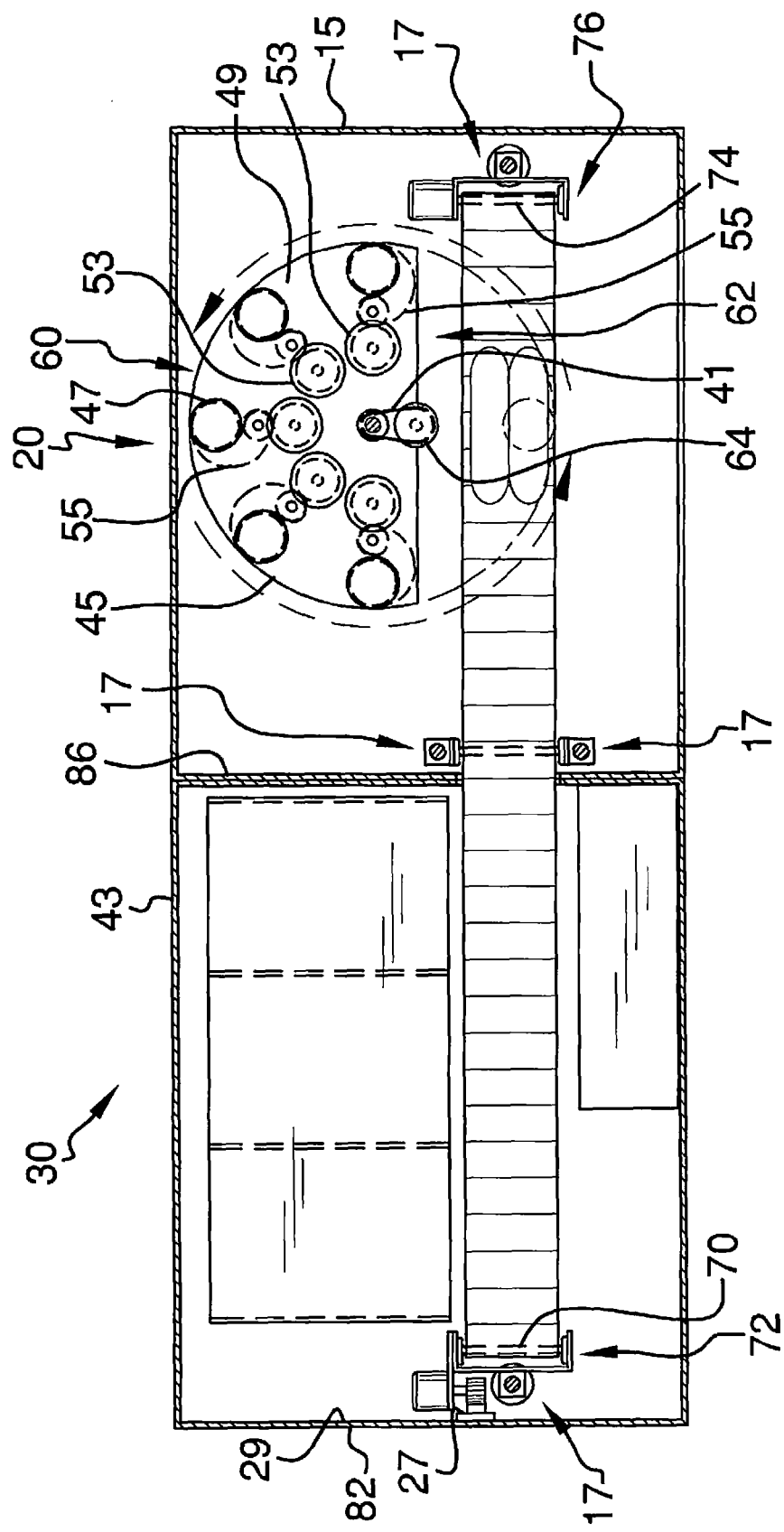
FIG. 5 is a cross sectional view taken along line 5-5 of FIG. 3 of an embodiment of the disclosure.
Figure 6:
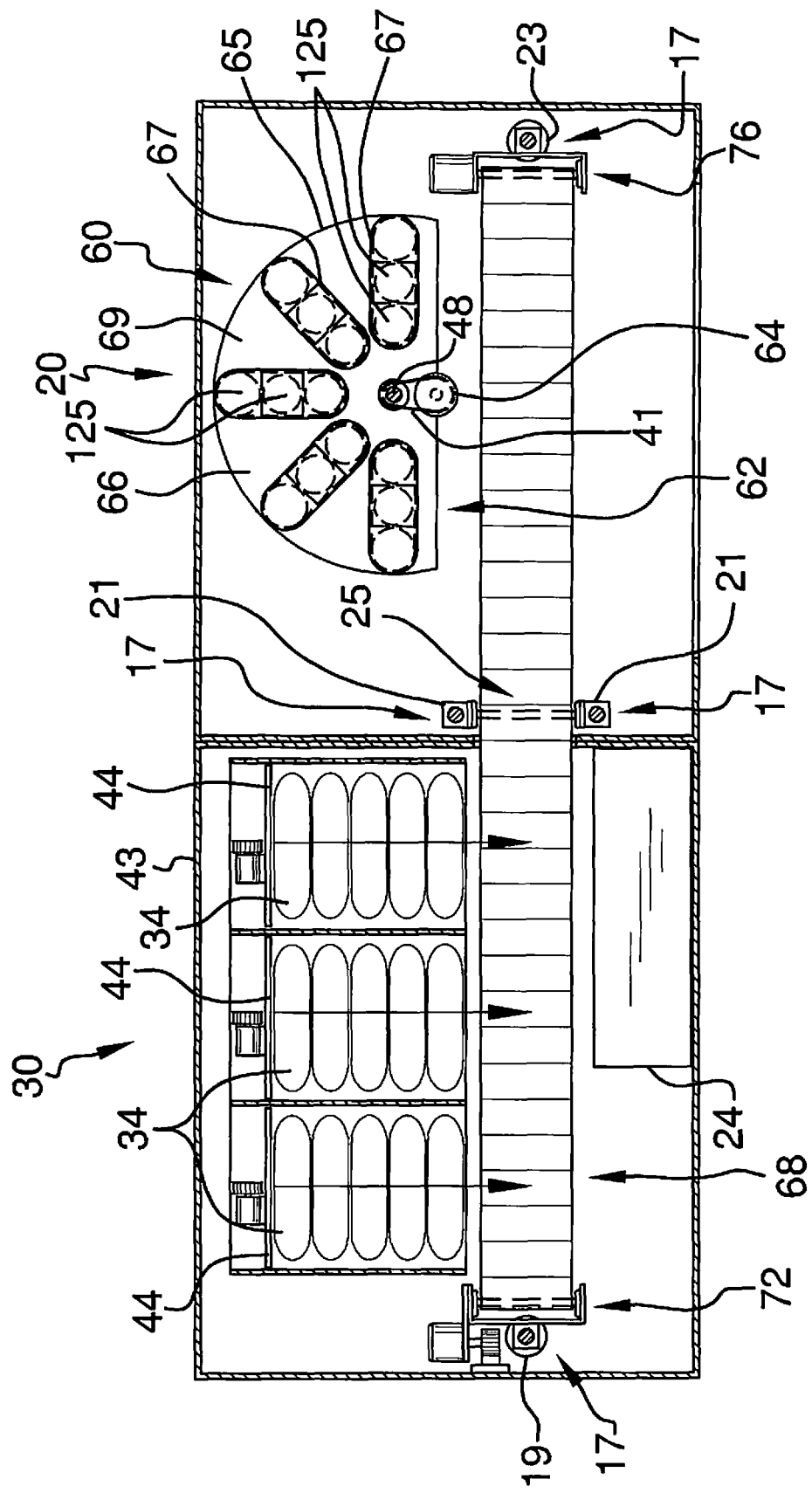
FIG. 6 is a cross sectional view taken along line 6-6 of FIG. 3 of an embodiment of the disclosure.
Figure 7:
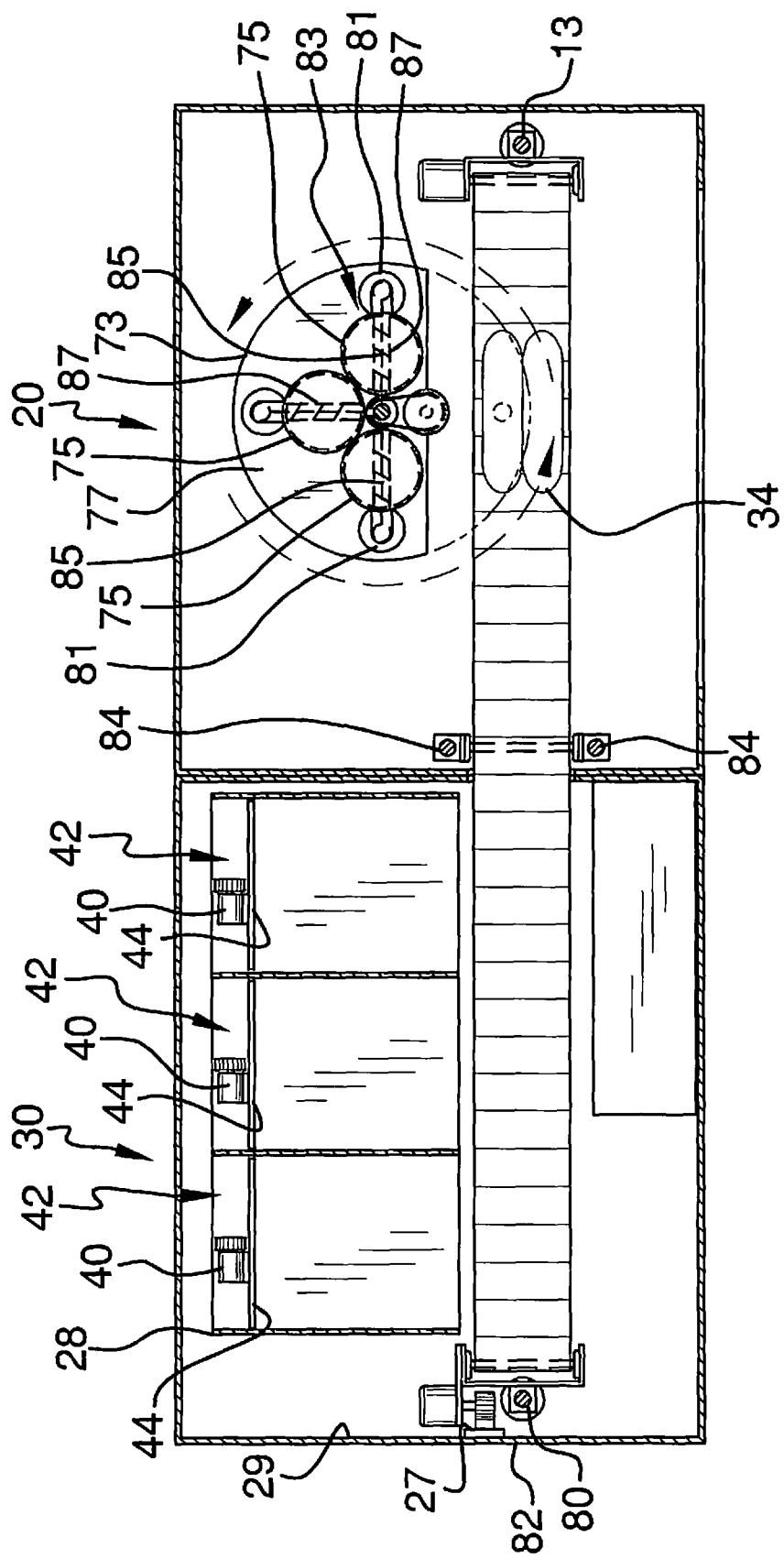
FIG. 7 is a cross sectional view taken along line 7-7 of FIG. 3 of an embodiment of the disclosure.
Figure 8:
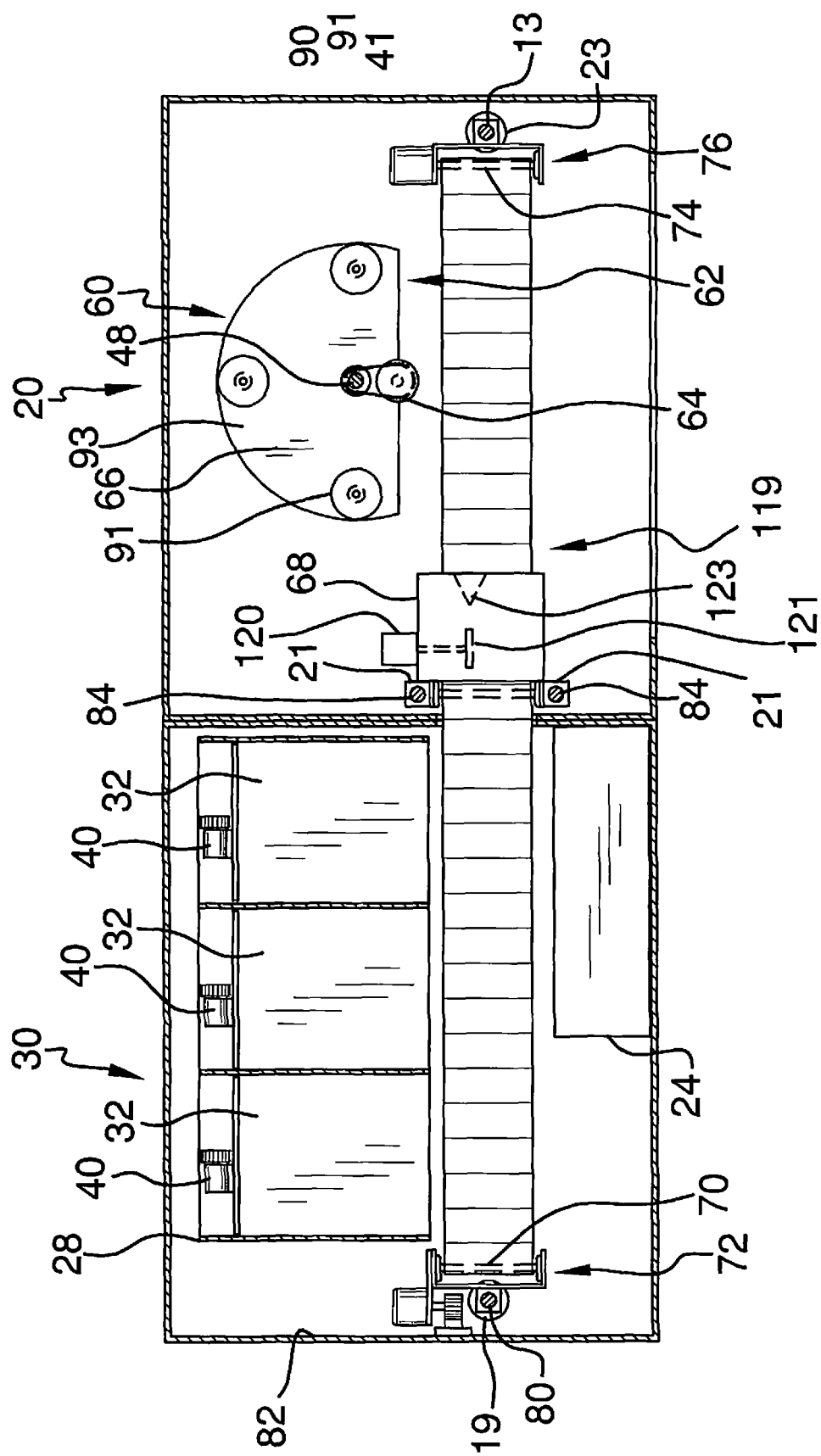
FIG. 8 is a cross sectional view taken along line 8-8 of FIG. 3 of an embodiment of the disclosure.
Figure 9:
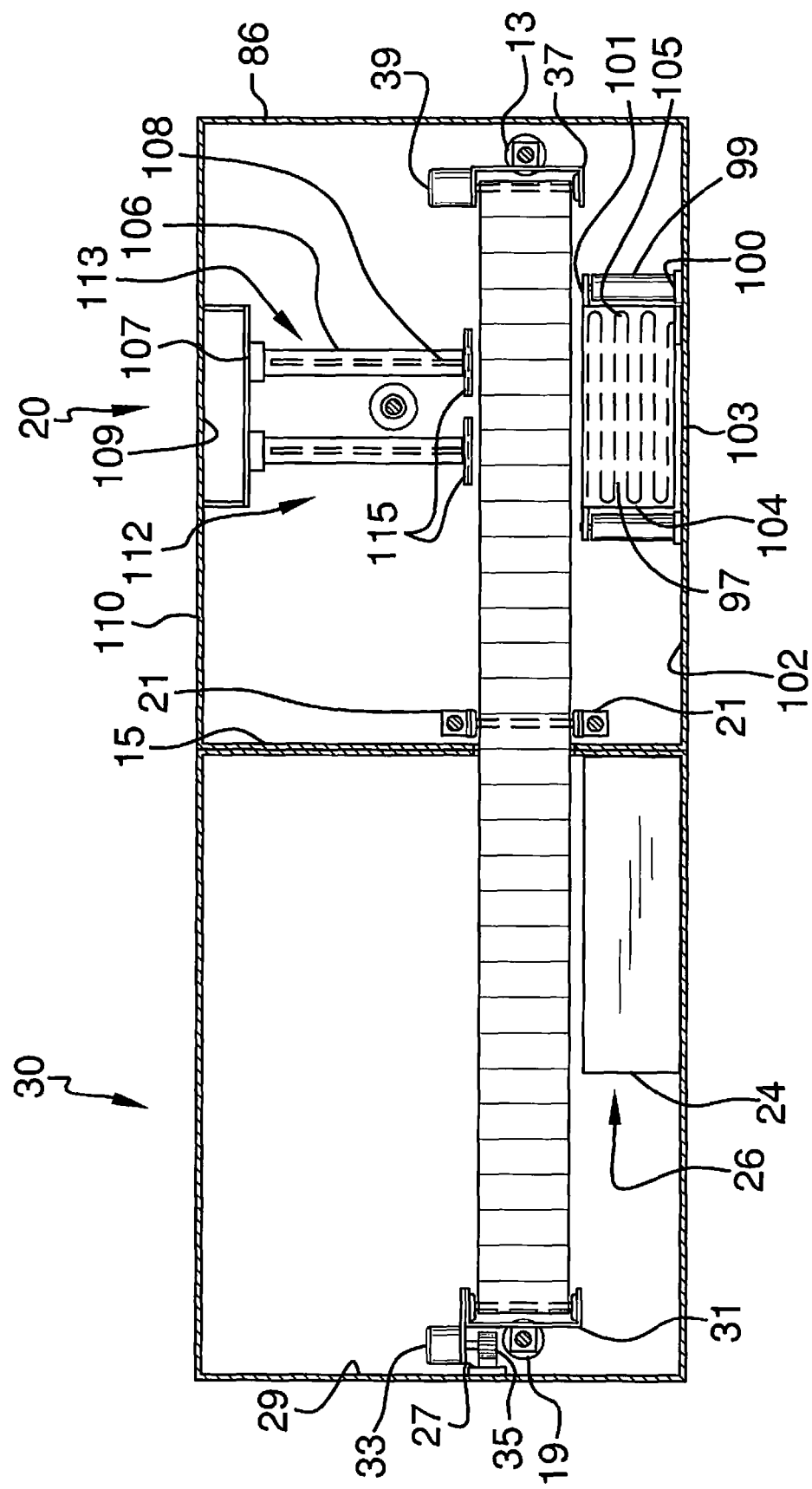
FIG. 9 is a cross sectional view taken along line 9-9 of FIG. 3 of an embodiment of the disclosure.

With reference now to the drawings, and in particular to FIGS. 1 through 9 thereof, a new rotating sandwich dispenser device embodying the principles and concepts of an embodiment of the disclosure and generally designated by the reference numeral 10 will be described.

As best illustrated in FIGS. 1 through 9, the rotating sandwich dispenser assembly 10 generally comprises a housing 12 configured to be positioned on a support surface 14. The housing 12 may have a width between 2 m and 2.5 m and a height between 1.5 m and 2 m. An opening 16 extends through a front wall 18 of a second section 20 of the housing 12. A window 22 is coextensively positioned within the opening 16 to completely cover the opening 16. A processor 24 is coupled to the housing 12. The processor 24 may comprise a personal computer 26 of any conventional design.

A bread dispenser 28 is coupled to and positioned within an interior of a first section 30 of the housing 12. The bread dispenser 28 comprises a plurality of bays 32. Each of the bays 32 contains one of a plurality of loaves of bread 34. The plurality of loaves of bread 34 may comprise a variety of types of bread 34 such as Italian bread, cheese bread, white bread or other types of bread 34. The plurality of the bays 32 is arranged in a plurality of columns 36 and rows 38. Each of the plurality of bays 32 may have a width between 25 cm and 33 cm and a height between 12 cm and 18 cm.

A bread motor 40 is coupled to the bread dispenser 28. The bread motor 40 is electrically coupled to the processor 24. The bread motor 40 may have an operational voltage between 20 volts AC and 110 volts AC. The bread motor 40 is one of a plurality of the bread motors 40. Each of the plurality of the bread motors 40 is positioned at a rear 42 of an associated one of each of the plurality of the bays 32. A plate 44 is movably coupled to a front 46 of the bread motor 40. The plate 44 is one of a plurality of the plates 44.

Each of the plurality of the bread motors 40 is selectively actuatable to an on position so the bread motor 40 pushes the plate 44 forwardly within the associated one of the bays 32. The plate 44 pushes the associated one of the loaves of bread 34 outwardly from a front 46 of the associated one of the bays 32. Each of the plurality of the bread motors 40 is selectively actuatable to an off position so the bread motor 40 retracts the plate 44 rearwardly into the associated one of the bays 32.

An ingredient dispenser pole 48 is coupled to and extends between each of a bottom wall 50 of the housing 12 and a top wall 52 of the housing 12. The ingredient dispenser pole 48 is positioned proximate a center 54 of the second section 20 of the housing 12. The ingredient dispenser pole 48 may have a diameter between 2.5 cm and 5 cm. An ingredient dispenser 56 is rotatably coupled to the ingredient dispenser pole 48 so the ingredient dispenser 56 may selectively dispense sandwich ingredients 58 onto the loaf of bread 34. The ingredient dispenser 56 has a round side 60 and a flat side 62. An ingredient dispenser motor 64 is coupled to a top 66 of the ingredient dispenser 56. The ingredient dispenser motor 64 is electrically coupled to the processor 24. The ingredient dispenser motor 64 may have an operational voltage between 20 volts AC and 110 volts AC.

A conveyor belt 68 is movably coupled to the housing 12. The conveyor belt 68 receives the loaf of bread 34 from the bread dispenser 28 so the conveyor belt 68 may transport the loaf of bread 34 to the ingredient dispenser 56. The conveyor belt 68 may be comprised of a flexible material such as rubber or other similar material. The conveyer belt 68 may form a closed loop that may have a length between 1.75 m and 2.25 m. A first conveyor roller 70 may be positioned at a first end 72 of the conveyor belt 68. A second conveyor roller 74 may be positioned at a second end 76 of the conveyor belt 68. The conveyor belt 68 may roll around each of the first 70 and second 74 conveyor rollers.

A conveyor lift pole 78 is coupled to and extends between each of the bottom 50 and top 52 walls of the housing 12. The conveyor lift pole 78 may have a diameter between 2.5 cm and 5 cm. The conveyor lift pole 78 is one of a plurality of conveyor lift poles 78. A first one of the conveyor lift poles 80 is positioned within the first section 30 of the housing 12 proximate a first lateral wall 82 of the first section 30 of the housing 12. A second one of the conveyor lift poles 84 is positioned within the second section 30 of the housing 12 proximate a first lateral wall 86 of the second section 20 of the housing 12. The second conveyor lift pole 84 may be one of a pair of second conveyor lift poles 84. Each of the pair of second conveyor lift poles 84 may be positioned proximate a front side 88 and a rear side 11 of the conveyor belt 68. A third one of the conveyor lift poles 13 is positioned within the second section 20 of the housing 12 proximate a second lateral 15 wall of the second section 20 of the housing 12.

A bearing 17 is slidably coupled around the conveyor lift pole 78 so the bearing 17 may move freely upwardly and downwardly along the conveyor lift pole 78. The bearing 17 may comprise a friction reducing bearing of any conventional design. The bearing 17 is one of a plurality of bearings 17. A first one of the bearings 19 is slidably coupled around the first conveyor lift pole 80. A second one of the bearings 21 is slidably coupled around the second conveyor lift pole 84. The second bearing 21 may be one of a pair of second bearings 21. Each of pair of the second bearings 21 may be positioned around a corresponding one of each of the second conveyor lift poles 84. A third one of the bearings 23 is slidably coupled around the third conveyor lift pole 13. The first end 72 of the conveyor belt 68 is coupled to the first bearing 19. A middle 25 of the conveyor belt 68 is coupled to the second bearing 21. The second end 76 of the conveyor belt 68 is coupled to the third bearing 23.

A gear rail 27 is coupled to an inner side 29 of the first lateral wall 82 of the first section 30 of the housing 12 such that the gear rail 27 extends between each of the top 52 and bottom 50 walls of the housing 12. The gear rail 27 is positioned proximate the first conveyor lift pole 80. A conveyor lift motor bracket 31 is coupled to the first end 72 of the conveyor belt 68. A conveyor lift motor 33 is coupled to the conveyor lift motor bracket 31. The conveyor lift motor 33 may have an operational voltage between 20 volts AC and 11 volts AC. The conveyor lift motor 33 is electrically coupled to the processor 24.

A conveyor gear 35 is coupled to the conveyor lift motor 33 so the conveyor lift motor 33 rotates the conveyor gear 35. The conveyor gear 35 engages the gear rail 27 so the conveyor lift motor 33 may selectively move the conveyor belt 68 upwardly and downwardly along each of the conveyor lift poles 78. A conveyor rotation motor bracket 37 is coupled to the second end 76 of the conveyor belt 68. A conveyor rotation motor 39 is coupled to the conveyor rotation motor bracket 37. The conveyor rotation motor 39 is electrically coupled to the processor 24. The conveyor rotation motor 39 may selectively rotate the conveyor belt 68 in a first direction so the conveyor belt 68 may transport the loaf of bread 34 toward the second lateral wall 15 of the second section 20 of the housing 12. The conveyor rotation motor 39 may selectively rotate the conveyor belt 68 in a second direction so the conveyor belt 68 may transport the loaf of bread 34 toward the first lateral wall 82 of the first section 30 of the housing 12.

A belt 41 is coupled between the ingredient dispenser motor 64 and the ingredient dispenser pole 48. The ingredient dispenser motor 64 may rotate the ingredient dispenser 56 about the ingredient dispenser pole 48. The ingredient dispenser motor 64 selectively rotates the ingredient dispenser 56 in a first position so the round side 60 of the ingredient dispenser 56 is positioned over the conveyor belt 68. The ingredient dispenser 56 may dispense sandwich ingredients 58 onto the loaf of bread 34 when the ingredient dispenser 56 is positioned in the first position.

The ingredient dispenser motor 64 may selectively rotate the ingredient dispenser 56 in a second position so the round side 60 of the ingredient dispenser 56 is positioned proximate a rear wall 43 of the housing 12. When the ingredient dispenser 56 is positioned in the second position, the flat side 62 of the ingredient dispenser 56 is positioned proximate the conveyor belt 68 to prevent the conveyor belt 68 from contacting the ingredient dispenser 56. The ingredient dispenser 56 is positioned in the second position to allow the conveyor belt 68 to be moved upwardly and downwardly along the conveyor lift poles 78.

The ingredient dispenser 56 is one of a plurality of the ingredient dispensers 56. The plurality of the ingredient dispensers comprises a meat dispenser 45 positioned proximate a top 63 of the ingredient dispenser pole 48. A meat tube 47 is coupled to and extends upwardly from a top 49 of the meat dispenser 45. The meat tube 47 may contain meat 51. The meat tube 47 is one of a plurality of meat tubes 47. Additionally, each of the meat tubes 47 may contain one of a plurality of various types of meat 51. Each of the meat tubes 47 is evenly distributed around an entire perimeter of the round side 60 of the meat dispenser 45.

A blade motor 53 is coupled to the top 49 of the meat dispenser 45. The blade motor 53 is electrically coupled to the processor 24. The blade motor 53 may have an operational voltage between 20 volts AC and 110 volts AC. The blade motor 53 is one of a plurality of blade motors 53. Each of the blade motors 53 is evenly distributed around an entire perimeter of the round side 60 of the meat dispenser 45.

A blade 55 is rotatably coupled to a bottom 57 of the meat dispenser 45 proximate an open bottom end 59 of the meat tube 47. The blade 55 is one of a plurality of blades 55. Each of the blades 55 is evenly distributed around an entire perimeter of the round side 60 of the meat dispenser 45.

A blade gear 61 is coupled to the blade motor 53 so the blade motor 53 rotates the blade gear 61. The blade gear 61 engages the blade 55 so the blade gear 61 rotates the blade 55. The blade 55 may slice the meat 51 when the blade 55 is rotated. The sliced meat 51 is dispensed downwardly out of the open bottom end 59 of the meat tube 47 onto the bread 34 when the meat dispenser 45 is positioned in the first position. The blade gear 61 is one of a plurality of blade gears 61. Each of the blade gears 61 is distributed evenly around an entire perimeter of the round side 60 of the meat dispenser 45.

A sliced vegetable dispenser 65 is positioned on the ingredient dispenser pole 48 below the meat dispenser 45. A sliced vegetable tube 67 is coupled to and extends upwardly from a top 69 of the sliced vegetable dispenser 65. The sliced vegetable tube 67 may contain a plurality of types of sliced vegetables 125. The sliced vegetables 125 may comprise sliced tomatoes, sliced cucumbers or other similar sliced vegetables 125. The sliced vegetable tube 67 is one of a plurality of sliced vegetable tubes 67. Each of the sliced vegetable tubes 67 is positioned around an entire perimeter of the round side 60 of the sliced vegetable dispenser 65. The sliced vegetable tubes 67 selectively dispense one of the sliced vegetables 125 out of an open bottom end 71 of the sliced vegetable tube 67 onto the bread 34 when the vegetable dispenser 65 is positioned in the first position.

A shredded vegetable dispenser 73 is positioned on the ingredient dispenser pole 48 below the sliced vegetable dispenser 65. A hopper 75 is coupled to and extends upwardly from a top 77 of the shredded vegetable dispenser 73. The hopper 75 may contain shredded vegetables 79. The hopper 75 is one of a plurality of hoppers 75. Each of the hoppers 75 is evenly distributed around an entire perimeter of the round side 60 of the shredded vegetable dispenser 73. The hoppers 75 may each contain a plurality of types of shredded vegetables 79 such as lettuce, carrots or other similar shredded vegetables 79.

A shredded vegetable motor 81 is coupled to a side 83 of the hopper 75. The shredded vegetable motor 81 may have an operational voltage between 20 volts AC and 110 volts AC. The shredded vegetable motor 81 is electrically coupled to the processor 24. The shredded vegetable motor 81 is one of a plurality of shredded vegetable motors 81. Each of the shredded vegetable motors 81 is coupled to an associated one of the plurality of hoppers 75.

A screw 85 is rotatably coupled within a screw tube 87 coupled to a top 89 of the shredded vegetable dispenser 73. The screw 85 is one of a plurality of screws 85 each positioned within an associated one of a plurality of the screw tubes 87. The plurality of the screw tubes 87 is evenly distributed around an entire perimeter of the round side 60 of the shredded vegetable dispenser 73. Each of the screw tubes 87 selectively dispenses a measured amount of the shredded vegetables 79 onto the bread 34 when the shredded vegetable dispenser 73 is positioned in the first position.

A condiment dispenser 90 is positioned on the ingredient dispenser pole 48 below the shredded vegetable dispenser 73. A condiment tube 91 is coupled to and extends upwardly from a top 93 of the condiment dispenser 90. The condiment tube 91 may store a condiment 95. The condiment tube 91 is one of a plurality of condiment tubes 91. Additionally, each of the condiment tubes 91 may contain one of a plurality of condiments 95 such as mayonnaise, mustard, ketchup or other similar condiments 95. Each of the condiment tubes 91 is evenly distributed around an entire perimeter of the round side 60 of the condiment dispenser 90. Each of the condiment tubes 91 dispenses a measured amount of the condiment 95 onto the bread 34 when the condiment dispenser 90 is positioned in the first position.

A heat plate 97 is movably coupled to the housing 12. The heat plate 97 is positioned proximate a bottom end 98 of the ingredient dispenser pole 48. The heat plate 97 may comprise an infra red oven of any conventional design. The heat plate 97 is electrically coupled to the processor 24. A heat plate piston 99 has a fixed end 100 and a movable end 101. The fixed end 100 of the heat plate piston 99 is coupled to an inside 102 of a front wall 103 of the second section 20 of the housing 12. The movable end 101 of the heat plate piston 99 is coupled to the heat plate 97. The heat plate piston 99 is electrically coupled to the processor 24.

The heat plate piston 99 is acutatable in a retracted position that has the movable end 101 of the heat plate piston 99 positioned proximate the heat plate piston 99. The heat plate piston 99 is actuatable in an extended position that has the movable end 101 of the heat plate piston 99 extended outwardly from the heat plate piston 99 so the heat plate 97 is positioned proximate the conveyor belt 68. When the heat plate piston 99 is in the extended position the heat plate 97 may be selectively actuated to toast the loaf of bread 34. The heat plate piston 99 is one of a pair of the heat plate pistons 99. Each of the heat plate pistons 99 is positioned proximate each of an associated first 104 and second 105 lateral sides of the heat plate 97.

A dispensing piston 106 has a fixed end 107 and a movable end 108. The fixed end 107 of the dispensing piston 106 is coupled to an inner side 109 of a rear wall 110 of the second section 20 of the housing 12 proximate a bottom 111 of the housing 12. The dispensing piston 106 is electrically coupled to the processor 24. The dispensing piston 106 is one of a pair of the dispensing pistons 106. A first one of the dispensing pistons 112 is positioned proximate the second lateral wall 15 of the second section 20 of the housing 12. A second one of the dispensing pistons 113 is positioned proximate the first lateral wall 86 of the second section 20 of the housing 12.

A plate 115 is coupled to the movable end 108 of the dispensing piston 106. The plate 115 is one of a plurality of plates 115. Each of the plates 115 is coupled to the movable end 108 of an associated one of the first 112 and second 113 dispensing pistons. The dispensing piston 106 is actuatable in a retracted position that has the plate 115 positioned proximate the dispensing piston 106. The dispensing piston 106 is actuatable in an extended position so the plate 115 is positioned proximate a dispensing aperture 117 extending through the front wall 103 of the second section 20 of the housing 12. The dispensing aperture 117 is positioned proximate the bottom 111 of the housing 12. The plate 115 may push the loaf of bread 34 out of the dispensing aperture 117.

A bread cutter 119 is coupled to the second bearing 21 so the bread cutter 119 is positioned proximate the second conveyor lift pole 84. A bread cutter motor 120 is coupled to the bread cutter 119. The bread cutter motor 120 is electrically coupled to the processor 24. The bread cutter motor 120 may have an operational voltage between 20 volts AC and 110 volts AC. A bread blade 121 is rotatably coupled to the bread cutter motor 120 so the bread cutter motor 120 rotates the bread blade 121.

The bread blade 121 longitudinally cuts the loaf of bread 34 when the conveyor belt 68 transports the loaf of bread 34 toward the second lateral wall 15 of the second section 20 of said housing 12. A bread spreader 123 is coupled to the bread cutter 119. The bread spreader 123 engages the loaf of bread 34 after the bread blade 121 cuts the loaf of bread 34. The bread spreader 123 may spread the loaf of bread 34 so the loaf of bread 34 may receive the sandwich ingredients 58.

After the conveyor belt 68 transports the loaf of bread 34 through the bread cutter 119, the conveyor lift motor 33 may selectively position the conveyor belt 68 in a meat 51 position. The conveyor belt 68 is positioned beneath the meat dispenser 45 when the meat dispenser 45 is positioned in the first position. The meat dispenser 45 may dispense the slices of meat 51 across the entire length of the loaf of bread 34.

Additionally, after the conveyor belt 68 is positioned in the meat 51 position, the conveyor lift motor may 33 selectively position the conveyor belt 68 in a sliced vegetable 125 position. The conveyor belt 68 is positioned beneath the sliced vegetable dispenser 65 when the sliced vegetable dispenser 65 is positioned in the first position. The sliced vegetable dispenser 65 may dispense the sliced vegetables 125 on top of the slices of meat 51.

Once the conveyor belt 68 has been positioned in the sliced vegetable 125 position, the conveyor lift motor 33 may selectively position the conveyor belt 68 in a shredded vegetable 79 position. The conveyor belt 68 is positioned beneath the shredded vegetable dispenser 73 when the shredded vegetable dispenser 73 is positioned in the first position. The shredded vegetable dispenser 73 may dispense the shredded vegetables 79 on top of the sliced vegetables 125.

After the conveyor belt 68 is positioned in the shredded vegetable 79 position, the conveyor lift motor 33 may selectively position the conveyor belt 68 in a condiment 95 position. The conveyor belt 68 is positioned beneath the condiment dispenser 90 when the condiment dispenser 90 is positioned in the first position. The condiment dispenser 90 may dispense the condiments 95 on top of the shredded vegetables 79.

Finally, after the conveyor belt 68 is positioned in the condiment 95 position, the conveyor lift motor 33 may selectively position the conveyor belt 68 in a heating position. The conveyor belt 68 is positioned proximate the heat plate 97. The heat plate 97 may toast the loaf of bread 34 after the sandwich ingredients 58 are placed on the loaf of bread 34.

A control panel 127 is coupled to a front wall 128 of the first section 30 of the housing 12. The control panel 127 is electrically coupled to the processor 24. The control panel 127 comprises a display 129. The display 129 may comprise a touch screen display. The display 129 displays indicia 130 and the indicia 130 comprise a plurality of images of sandwiches 131. A selected one of the images of sandwiches 131 is selectable so the processor 24 actuates corresponding ones of the bread dispenser 28 and the ingredient dispensers 56. Any combination of sandwich ingredients 58 and types of bread 34 may be selected on the control panel 127.

A payment selector 133 is coupled to the front wall 128 of the first section 30 of the housing 12. The payment selector 133 is electrically coupled to the processor 24. The payment selector 133 selectively receives a method of payment for a selected one of the sandwiches 131. A display 135 is coupled to the front wall 128 of the first section 30 of the housing 12 proximate the top wall 52 of the housing. The display 135 is electrically coupled to the processor 24. The display 135 may comprise an LCD display 136 of any conventional design. The display 135 may display types of sandwiches 131 available. The display 135 is one of a plurality of displays 135.

In use, a user 137 may touch the control panel 127 to select a type of bread 34. After selecting the type of bread 34 to be used, the user 137 may select any combination of the sandwich ingredients 58. The user 137 may additionally select to have the sandwich 131 toasted after the sandwich ingredients 58 have been dispensed on the bread 34. Upon completion of the selection of bread 34 and sandwich ingredients 58, the user 137 may use the payment selector 133 to pay for the sandwich. Once the sandwich 131 is completed, the sandwich 131 will be dispensed through the dispenser aperture 117.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A rotating sandwich dispenser assembly comprising:
a housing configured to be positioned on a support surface;
a processor coupled to said housing;
a bread dispenser coupled to said housing, said bread dispenser being operationally coupled to said processor wherein said bread dispenser is configured to dispense a loaf of bread,
an ingredient dispenser rotatably coupled to said housing, said ingredient dispenser being operationally coupled to said processor wherein said ingredient dispenser is configured to selectively dispense sandwich ingredients onto the loaf of bread,
a conveyor belt movably coupled to said housing, said conveyor belt being operationally coupled to said processor wherein said conveyor belt receives the loaf of bread from said bread dispenser wherein said conveyor belt transports the loaf of bread to said ingredient dispenser; and
a control panel coupled to said housing, said control panel being operationally coupled to said processor wherein said control panel selectively actuates said processor;
a conveyor lift pole coupled to and extending between each of a bottom wall of said housing and a top wall of said housing;
a bearing slidably coupled around said conveyor lift pole wherein said bearing moves freely upwardly and downwardly along said conveyor lift pole;
said conveyor lift pole being one of a plurality of said conveyor lift poles, a first one of said conveyor lift poles being positioned within a first section of said housing proximate a first lateral wall of said first section of said housing, a second one of said conveyor lift poles being positioned within a second section of said housing proximate a first lateral wall of said second section of said housing, a third one of said conveyor lift poles being positioned within said second section of said housing proximate a second lateral wall of said second section of said housing;
said bearing being one of a plurality of said bearings, a first one of said bearing being slidably coupled around said first conveyor lift pole, a second one of said bearings being slidably coupled around said second conveyor lift pole, a third one of said bearings being slidably coupled around said third conveyor lift poles; and
a first end of said conveyor belt being coupled to said first bearing, a middle of said conveyor being coupled to said second bearing, a second end of said conveyor belt being coupled to said third bearing.

2. The assembly according to claim 1, further comprising:
said bread dispenser being positioned within an interior of a first section of said housing;
said bread dispenser comprising a plurality of bays, each of said bays containing one of the loafs of bread; and
said plurality of said bays being arranged in a plurality of columns and rows.

3. The assembly according to claim 1, further comprising:
a bread motor coupled to said bread dispenser;
a plate movably coupled to a front of said bread motor;
said bread motor being electrically coupled to said processor;
said bread motor being one of a plurality of said bread motors;
said plate being one of a plurality of said plates;
said bread dispenser comprising a plurality of bays, each of said bays containing one of the loafs of bread;

each of said plurality of said bread motors being positioned at a rear of an associated one of each of said plurality of said bays; and each of said plurality of said bread motors being selectively actuatable to an on position wherein said bread motor pushes said plate forwardly within said bay wherein said plate pushes the associated one of the loafs of bread outwardly from a front of the associated one of said bays, each of said plurality of said bread motors being selectively actuatable to an off position wherein said bread motor retracts said plate rearwardly in the associated one of said bays.

4. The assembly according to claim 1, further comprising:

an ingredient dispenser pole coupled to and extending between each of a bottom wall of said housing and a top wall of said housing, said ingredient dispenser pole being positioned proximate a center of a second section of said housing;

said ingredient dispenser being rotatably coupled to said ingredient dispenser pole;

an ingredient dispenser motor coupled to a top of said ingredient dispenser;

said ingredient dispenser motor being electrically coupled to said processor;

a belt coupled between said ingredient dispenser motor and said ingredient dispenser pole wherein said ingredient dispenser motor rotates said ingredient dispenser about said ingredient dispenser pole; and said ingredient dispenser motor selectively rotating said ingredient dispenser in a first position wherein said ingredient dispenser is positioned over said conveyor belt, said ingredient dispenser motor selectively rotating said ingredient dispenser in a second position wherein said ingredient dispenser is positioned proximate a rear wall of said housing.

5. The assembly according to claim 4, further comprising:

said ingredient dispenser being one of a plurality of said ingredient dispensers, said plurality of said ingredient dispensers comprising;

a meat dispenser positioned proximate a top of said ingredient dispenser pole;

a meat tube coupled to and extending upwardly from a top of said meat dispenser, said meat tube being configured to contain meat;

a blade motor coupled to a top of said meat dispenser;

said blade motor being electrically coupled to said processor;

a blade rotatably coupled to a bottom of said meat dispenser proximate an open bottom end of said meat tube;

a blade gear coupled to said blade motor wherein said blade motor rotates said blade gear, said blade gear engaging said blade wherein said blade gear rotates said blade wherein said blade is configured to slice the meat such that the sliced meat is dispensed downwardly out of said open bottom end of said meat tube onto said conveyor belt when said meat dispenser is positioned in said first position;

said meat tube being one of a plurality of said meat tubes, each of said meat tubes being evenly distributed around an entire perimeter of said meat dispenser;

said blade motor being one of a plurality of said blade motors, each of said blade motors being evenly distributed around an entire perimeter of said meat dispenser;

said blade gear being one of a plurality of said blade gears, each of said blade gears being distributed evenly around an entire perimeter of said meat dispenser; and said blade being one of a plurality of said blades, each of said blades being evenly distributed around an entire perimeter of said meat dispenser.

6. The assembly according to claim 4, further comprising:

said ingredient dispenser being one of a plurality of said ingredient dispensers, said plurality of said ingredient dispensers comprising;

a sliced vegetable dispenser positioned on said ingredient dispenser pole below a meat dispenser;

a sliced vegetable tube coupled to and extending upwardly from a top of said sliced vegetable dispenser, said sliced vegetable tube being configured to contain a plurality of sliced vegetables;

said sliced vegetable tube being one of a plurality of said sliced vegetable tubes, each of said sliced vegetable tubes being positioned around an entire perimeter of said sliced vegetable dispenser; and each of said sliced vegetable tubes selectively dispensing one of the sliced vegetables out of an open bottom end of said sliced vegetable tube onto said conveyor belt when said vegetable dispenser is positioned in said first position.

7. The assembly according to claim 4, further comprising:

said ingredient dispenser being one of a plurality of said ingredient dispensers, said plurality of said ingredient dispensers comprising;

a shredded vegetable dispenser positioned on said ingredient dispenser pole below a sliced vegetable dispenser;

a hopper coupled to and extending upwardly from a top of said shredded vegetable dispenser, said hopper being configured to contain shredded vegetables;

a shredded vegetable motor coupled to a side of said hopper;

said shredded vegetable motor being electrically coupled to said processor;

a screw rotatably coupled within a screw tube coupled to a top of said shredded vegetable dispenser;

said hopper being one of a plurality of hoppers, each of said hoppers being evenly distributed around an entire perimeter of said shredded vegetable dispenser;

said shredded vegetable motor being one of a plurality of shredded vegetable motors, each of said shredded vegetable motors being coupled to an associated one of said plurality of hoppers;

said screw being one of a plurality of said screws each positioned within an associated one of a plurality of said screw tubes, said plurality of said screw tubes being evenly distributed around an entire perimeter of said shredded vegetable dispenser; and each of said screw tubes selectively dispensing a measured amount of the shredded vegetables onto said conveyor belt when said shredded vegetable dispenser is positioned in said first position.

8. The assembly according to claim 4, further comprising:

said ingredient dispenser being one of a plurality of said ingredient dispensers, said plurality of said ingredient dispensers comprising;

a condiment dispenser positioned on said ingredient dispenser pole below a shredded vegetable dispenser;

a condiment tube coupled to and extending upwardly from a top of said condiment dispenser, said condiment tube being configured to store a condiment;

said condiment tube being one of a plurality of condiment tubes, each of said condiment tubes being evenly distributed around an entire perimeter of said condiment dispenser; and each of said condiment tubes dispensing a measured amount of the condiment onto said conveyor belt when said condiment dispenser is positioned in said first position.

9. The assembly according to claim 1, further comprising:
a heat plate movably coupled to said housing, said heat plate being positioned proximate a bottom end of an ingredient dispenser pole;
a heat plate piston having a fixed end and a movable end, said fixed end of said heat plate piston being coupled to a front wall of a second section of said housing, said movable end of said heat plate piston being coupled to said heat plate;
said heat plate piston being electrically coupled to said processor;
said heat plate piston being acutatable in a retracted position having said movable end of said heat plate piston positioned proximate said heat plate piston, said heat plate piston being actuatable in an extended position having said movable end of said heat plate piston extended outwardly from said heat plate piston wherein said heat plate is positioned proximate said conveyor belt; and
said heat plate piston being one of a pair of said heat plate pistons, each of said heat plate pistons being positioned proximate each of an associated first and second lateral sides of said heat plate.

10. The assembly according to claim 1, further comprising:
a dispensing piston having a fixed end and a movable end, said fixed end of said dispensing piston being coupled to a rear wall of a second section of said housing;
a plate coupled to said movable end of said dispensing piston;
said dispensing piston being electrically coupled to said processor;
said dispensing piston being actuatable in a retracted position having said plate positioned proximate said dispensing piston, said dispensing piston being actuatable in an extended position having said plate being positioned proximate a dispensing aperture extending through a front wall of said second section of said housing;
said dispensing piston being one of a pair of said dispensing pistons, a first one of said dispensing pistons being positioned proximate a second lateral wall of said second section of said housing, a second one of said dispensing pistons being positioned proximate a first lateral wall of said second section of said housing; and
said plate being one of a plurality of said plates, each of said plates being coupled to a movable end of an associated one of said first and second dispensing pistons.

11. The assembly according to claim 1, further comprising:
a gear rail coupled to said first lateral wall of said first section of said housing such that said gear rail extends between each of said top and bottom walls of said housing, said gear rail being positioned proximate said first conveyor lift pole;
a conveyor lift motor coupled to said first end of said conveyor belt;
said conveyor lift motor being electrically coupled to said processor;
a conveyor gear coupled to said conveyor lift motor wherein said conveyor lift motor rotates said conveyor gear; and
said conveyor gear engaging said gear rail wherein said conveyor lift motor selectively moves said conveyor belt upwardly and downwardly along said conveyor lift pole.

12. The assembly according to claim 11, further comprising:
said conveyor lift motor selectively positioning said conveyor belt in a meat position wherein said conveyor is positioned beneath a meat dispenser when said meat dispenser is positioned in a first position;
said conveyor lift motor selectively positioning said conveyor belt in a sliced vegetable position wherein said conveyor belt is positioned beneath a sliced vegetable dispenser when said sliced vegetable dispenser is positioned in a first position;
said conveyor lift motor selectively positioning said conveyor belt in a shredded vegetable position wherein said conveyor belt is positioned beneath a shredded vegetable dispenser when said shredded vegetable dispenser is positioned in a first position;
said conveyor lift motor selectively positioning said conveyor belt in a condiment position wherein said conveyor belt is positioned beneath a condiment dispenser when said condiment dispenser is positioned in a first position; and
said conveyor lift motor selectively positioning said conveyor belt in a heating position wherein said conveyor belt is positioned proximate a heat plate.

13. The assembly according to claim 11, further comprising:
a conveyor rotation motor coupled to said second end of said conveyor belt;
said conveyor rotation motor being electrically coupled to said processor; and
said conveyor rotation motor selectively rotating said conveyor belt in a first direction wherein said conveyor belt is configured to transport the loaf of bread toward said second lateral wall of said second section of said housing, said conveyor rotation motor selectively rotating said conveyor belt in a second direction wherein said conveyor belt is configured to transport the loaf of bread toward said first lateral wall of said first section of said housing.

14. The assembly according to claim 1, further comprising:
a bread cutter coupled to said bearing extending around said first conveyor lift pole, said bread cutter being positioned proximate said second conveyor lift pole;
a bread cutter motor coupled to said bread cutter;
said bread cutter motor being electrically coupled to said processor;
a bread blade rotatably coupled to said bread cutter motor wherein said bread cutter motor rotates said bread blade;
said bread blade longitudinally cutting the loaf of bread when said conveyor belt transport the loaf of bread toward a second lateral wall of a second section of said housing; and
a bread spreader coupled to said bread cutter, said bread spreader engaging the loaf of bread after said bread blade cuts the loaf of bread wherein said bread spreader spreads the loaf of bread such that the loaf of bread may receive the sandwich ingredients.

15. The assembly according to claim 1, further comprising:
said control panel being coupled to a front wall of a first section of said housing, said control panel comprising a display, said display displaying indicia, said indicia comprising a plurality of images of sandwiches, a selected one of said images of sandwiches being selectable wherein said processor actuates corresponding ones of a bread dispenser and an ingredient dispenser;
a payment selector coupled to said front wall of said first section of said housing;

said payment selector being electrically coupled to said processor; and said payment selector selectively receiving a method of payment for a selected one of the sandwiches.

16. A rotating sandwich dispenser assembly comprising:
a housing configured to be positioned on a support surface;
a processor coupled to said housing;
a bread dispenser coupled to and positioned within an interior of a first section of said housing, said bread dispenser comprising a plurality of bays, each of said bays containing one of a plurality of loafs of bread, said plurality of said bays being arranged in a plurality of columns and rows;
a bread motor coupled to said bread dispenser, said bread motor being electrically coupled to said processor, said bread motor being one of a plurality of said bread motors, each of said plurality of said bread motors being positioned at a rear of an associated one of each of said plurality of said bays;
a plate movably coupled to a front of said bread motor, said plate being one of a plurality of said plates, each of said plurality of said bread motors being selectively actuatable to an on position wherein said bread motor pushes said plate forwardly within said bay wherein said plate pushes the associated one of the loafs of bread outwardly from a front of the associated one of said bays, each of said plurality of said bread motors being selectively actuatable to an off position wherein said bread motor retracts said plate rearwardly in the associated one of said bays;
an ingredient dispenser pole coupled to and extending between each of a bottom wall of said housing and a top wall of said housing, said ingredient dispenser pole being positioned proximate a center of a second section of said housing,
an ingredient dispenser rotatably coupled to said ingredient dispenser pole wherein said ingredient dispenser is configured to selectively dispense sandwich ingredients onto the loaf of bread;
an ingredient dispenser motor coupled to a top of said ingredient dispenser, said ingredient dispenser motor being electrically coupled to said processor,
a conveyor belt being movably coupled to said housing wherein said conveyor belt receives the loaf of bread from said bread dispenser wherein said conveyor belt transports the loaf of bread to said ingredient dispenser;
a conveyor lift pole coupled to and extending between each of a bottom wall of said housing and a top wall of said housing, said conveyor lift pole being one of a plurality of said conveyor lift poles, a first one of said conveyor lift poles being positioned within a first section of said housing proximate a first lateral wall of said first section of said housing, a second one of said conveyor lift poles being positioned within a second section of said housing proximate a first lateral wall of said second section of said housing, a third one of said conveyor lift poles being positioned within said second section of said housing proximate a second lateral wall of said second section of said housing;
a bearing slidably coupled around said conveyor lift pole wherein said bearing moves freely upwardly and downwardly along said conveyor lift pole, said bearing being one of a plurality of said bearings, a first one of said bearing being slidably coupled around said first conveyor lift pole, a second one of said bearings being slidably coupled around said second conveyor lift pole, a third one of said bearings being slidably coupled around said third conveyor lift poles, a first end of said conveyor belt being coupled to said first bearing, a middle of said conveyor being coupled to said second bearing, a second end of said conveyor belt being coupled to said third bearing;
a gear rail coupled to said first lateral wall of said first section of said housing such that said gear rail extends between each of said top and bottom walls of said housing, said gear rail being positioned proximate said first conveyor lift pole;
a conveyor lift motor coupled to said first end of said conveyor belt, said conveyor lift motor being electrically coupled to said processor;
a conveyor gear coupled to said conveyor lift motor wherein said conveyor lift motor rotates said conveyor gear, said conveyor gear engaging said gear rail wherein said conveyor lift motor selectively moves said conveyor belt upwardly and downwardly along said conveyor lift pole;
a conveyor rotation motor coupled to said second end of said conveyor belt, said conveyor rotation motor being electrically coupled to said processor, said conveyor rotation motor selectively rotating said conveyor belt in a first direction wherein said conveyor belt is configured to transport the loaf of bread toward said second lateral wall of said second section of said housing, said conveyor rotation motor selectively rotating said conveyor belt in a second direction wherein said conveyor belt is configured to transport the loaf of bread toward said first lateral wall of said first section of said housing;
a belt coupled between said ingredient dispenser motor and said ingredient dispenser pole wherein said ingredient dispenser motor rotates said ingredient dispenser about said ingredient dispenser pole, said ingredient dispenser motor selectively rotating said ingredient dispenser in a first position wherein said ingredient dispenser is positioned over said conveyor belt, said ingredient dispenser motor selectively rotating said ingredient dispenser in a second position wherein said ingredient dispenser is positioned proximate a rear wall of said housing, said ingredient dispenser being one of a plurality of said ingredient dispensers, said plurality of said ingredient dispensers comprising;
a meat dispenser positioned proximate a top of said ingredient dispenser pole,
a meat tube coupled to and extending upwardly from a top of said meat dispenser, said meat tube being configured to contain meat, said meat tube being one of a plurality of said meat tubes, each of said meat tubes being evenly distributed around an entire perimeter of said meat dispenser;
a blade motor coupled to a top of said meat dispenser, said blade motor being electrically coupled to said processor, said blade motor being one of a plurality of said blade motors, each of said blade motors being evenly distributed around an entire perimeter of said meat dispenser;
a blade rotatably coupled to a bottom of said meat dispenser proximate an open bottom end of said meat tube, said blade being one of a plurality of said blades, each of said blades being evenly distributed around an entire perimeter of said meat dispenser;
a blade gear coupled to said blade motor wherein said blade motor rotates said blade gear, said blade gear engaging said blade wherein said blade gear rotates said blade wherein said blade is configured to slice the meat such that the sliced meat is dispensed downwardly out of said open bottom end of said meat tube onto said conveyor belt when said meat dispenser is positioned in said first position, said blade gear being one of a plurality of said blade gears, each of said blade gears being distributed evenly around an entire perimeter of said meat dispenser;

a sliced vegetable dispenser positioned on said ingredient dispenser pole below said meat dispenser;

a sliced vegetable tube coupled to and extending upwardly from a top of said sliced vegetable dispenser, said sliced vegetable tube being configured to contain a plurality of sliced vegetables, said sliced vegetable tube being one of a plurality of said sliced vegetable tubes, each of said sliced vegetable tubes being positioned around an entire perimeter of said sliced vegetable dispenser, each of said sliced vegetable tubes selectively dispensing one of the sliced vegetables out of an open bottom end of said sliced vegetable tube onto said conveyor belt when said vegetable dispenser is positioned in said first position;

a shredded vegetable dispenser positioned on said ingredient dispenser pole below said sliced vegetable dispenser;

a hopper coupled to and extending upwardly from a top of said shredded vegetable dispenser, said hopper being configured to contain shredded vegetables, said hopper being one of a plurality of hoppers, each of said hoppers being evenly distributed around an entire perimeter of said shredded vegetable dispenser;

a shredded vegetable motor coupled to a side of said hopper, said shredded vegetable motor being electrically coupled to said processor, said shredded vegetable motor being one of a plurality of shredded vegetable motors, each of said shredded vegetable motors being coupled to an associated one of said plurality of hoppers;

a screw rotatably coupled within a screw tube coupled to a top of said shredded vegetable dispenser, said screw being one of a plurality of said screws each positioned within an associated one of a plurality of said screw tubes, said plurality of said screw tubes being evenly distributed around an entire perimeter of said shredded vegetable dispenser, each of said screw tubes selectively dispensing a measured amount of the shredded vegetables onto said conveyor belt when said shredded vegetable dispenser is positioned in said first position;

a condiment dispenser positioned on said ingredient dispenser pole below a shredded vegetable dispenser;

a condiment tube coupled to and extending upwardly from a top of said condiment dispenser, said condiment tube being configured to store a condiment, said condiment tube being one of a plurality of condiment tubes, each of said condiment tubes being evenly distributed around an entire perimeter of said condiment dispenser, each of said condiment tubes dispensing a measured amount of the condiment onto said conveyor belt when said condiment dispenser is positioned in said first position;

a heat plate movably coupled to said housing, said heat plate being positioned proximate a bottom end of said ingredient dispenser pole;

a heat plate piston having a fixed end and a movable end, said fixed end of said heat plate piston being coupled to a front wall of a second section of said housing, said movable end of said heat plate piston being coupled to said heat plate, said heat plate piston being electrically coupled to said processor, said heat plate piston being acutatable in a retracted position having said movable end of said heat plate piston positioned proximate said heat plate piston, said heat plate piston being actuatable in an extended position having said movable end of said heat plate piston extended outwardly from said heat plate piston wherein said heat plate is positioned proximate said conveyor belt, said heat plate piston being one of a pair of said heat plate pistons, each of said heat plate pistons being positioned proximate each of an associated first and second lateral sides of said heat plate;

a dispensing piston having a fixed end and a movable end, said fixed end of said dispensing piston being coupled to a rear wall of a second section of said housing, said dispensing piston being electrically coupled to said processor, said dispensing piston being one of a pair of said dispensing pistons, a first one of said dispensing pistons being positioned proximate a second lateral wall of said second section of said housing, a second one of said dispensing pistons being positioned proximate a first lateral wall of said second section of said housing;

a plate coupled to said movable end of said dispensing piston, said plate being one of a plurality of said plates, each of said plates being coupled to said movable end of an associated one of said first and second dispensing pistons, said dispensing piston being actuatable in a retracted position having said plate positioned proximate said dispensing piston, said dispensing piston being actuatable in an extended position having said plate being positioned proximate a dispensing aperture extending through a front wall of said second section of said housing;

said conveyor lift motor selectively positioning said conveyor belt in a meat position wherein said conveyor is positioned beneath said meat dispenser when said meat dispenser is positioned in said first position, said conveyor lift motor selectively positioning said conveyor belt in a sliced vegetable position wherein said conveyor belt is positioned beneath said sliced vegetable dispenser when said sliced vegetable dispenser is positioned in said first position, said conveyor lift motor selectively positioning said conveyor belt in a shredded vegetable position wherein said conveyor belt is positioned beneath said shredded vegetable dispenser when said shredded vegetable dispenser is positioned in said first position, said conveyor lift motor selectively positioning said conveyor belt in a condiment position wherein said conveyor belt is positioned beneath said condiment dispenser when said condiment dispenser is positioned in said first position, said conveyor lift motor selectively positioning said conveyor belt in a heating position wherein said conveyor belt is positioned proximate said heat plate;

a bread cutter coupled to said bearing, said bread cutter being positioned proximate said second conveyor lift pole;

a bread cutter motor coupled to said bread cutter, said bread cutter motor being electrically coupled to said processor;

a bread blade rotatably coupled to said bread cutter motor wherein said bread cutter motor rotates said bread blade, said bread blade longitudinally cutting the loaf of bread when said conveyor belt transport the loaf of bread toward said second lateral wall of said second section of said housing;

a bread spreader coupled to said bread cutter, said bread spreader engaging the loaf of bread after said bread blade cuts the loaf of bread wherein said bread spreader spreads the loaf of bread such that the loaf of bread may receive the sandwich ingredients;

a control panel coupled to a front wall of said first section of said housing, said control panel being electrically coupled to said processor, said control panel comprising a display, said display displaying indicia, said indicia comprising a plurality of images of sandwiches, a selected one of said images of sandwiches being selectable wherein said processor actuates corresponding ones of said bread dispenser and said ingredient dispenser; and a payment selector coupled to said front wall of said first section of said housing, said payment selector being electrically coupled to said processor, said payment selector selectively receiving a method of payment for a selected one of the sandwiches.

\* \* \* \* \*